June 8, 1954     R. A. PRICE     2,680,648
AERIAL SPRAY MECHANISM

Filed Feb. 9, 1950     2 Sheets-Sheet 1

INVENTOR
Robert Allen Price
BY
Bean, Brooks, Buckley & Bean
ATTORNEYS

June 8, 1954

R. A. PRICE 2,680,648

AERIAL SPRAY MECHANISM

Filed Feb. 9, 1950

INVENTOR
Robert Allen Price
BY
Bean, Brooks, Buckley & Bean.
ATTORNEYS

Patented June 8, 1954

2,680,648

UNITED STATES PATENT OFFICE 2,680,648

AERIAL SPRAY MECHANISM

Robert Allen Price, Williamsville, N. Y., assignor to Bell Aircraft Corporation, Buffalo, N. Y.

Application February 9, 1950, Serial No. 143,277

5 Claims. (Cl. 299—30)

1

This invention relates to spraying apparatus such as may be utilized in aerial spraying of terrain for pest control or any other purpose.

The advantages of aerial spraying in pest control, fertilizing, and like operations, have been recognized for some years. More recently rotary wing aircraft such as the helicopter, have been found especially suited to this work because of their slow forward speed and characteristic downrush of air under the rotor. In spraying foliage, this downrush of air has been found especially advantageous when used in conjunction with a fine "fog" type spray because the downdraft of air in such cases carries the "fog" to the ground, and then eddies up under the leaves, thereby coating the undersides of the leaves with spray material. On the other hand, a coarser spray is more efficient for treating open areas, such as swamplands for example; and inasmuch as modern methods often contemplate single flights over varying terrain it is highly desirable to provide means whereby the pilot may adjust the coarseness of the spray while in flight.

The primary object of this invention is to provide an improved aerial spray system which will enable the operator thereof while in flight to change at will the type of spray generated, so as to suit the varying requirements of the terrain traversed.

Another object of the invention is to provide a system for controlling the coarseness of such a spray as set forth hereinabove, which will utilize standard commercially available components, and which will be simple and reliable in operation.

Other objects and advantages of the invention will appear in the specification hereinafter.

In the drawing:

Fig. 2 is a piping diagram of the spray system of Fig. 1; and

Fig. 3 is a diagram of the control circuit of the spray system of Fig. 1;

Figure 1:
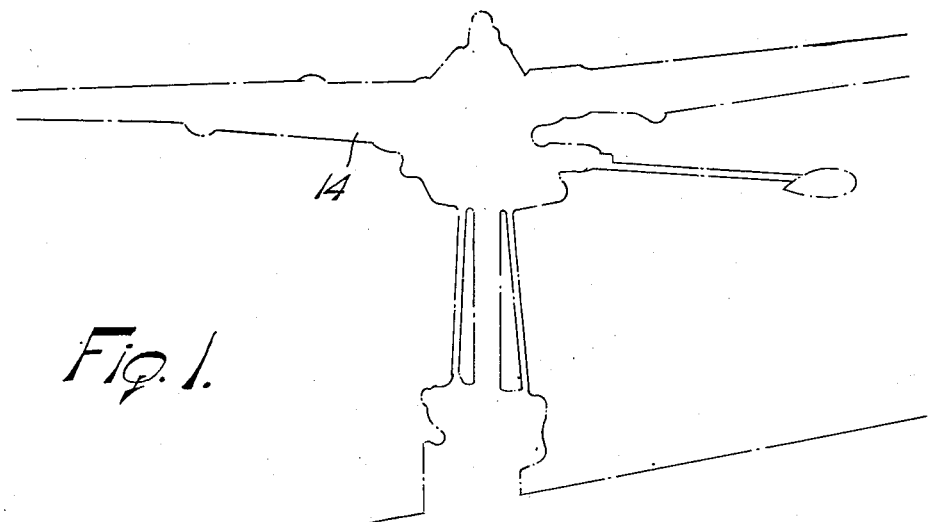
Fig. 1 is a diagrammatic fragmentary perspective view of a helicopter with a spray control according to the invention.
Figure 1:
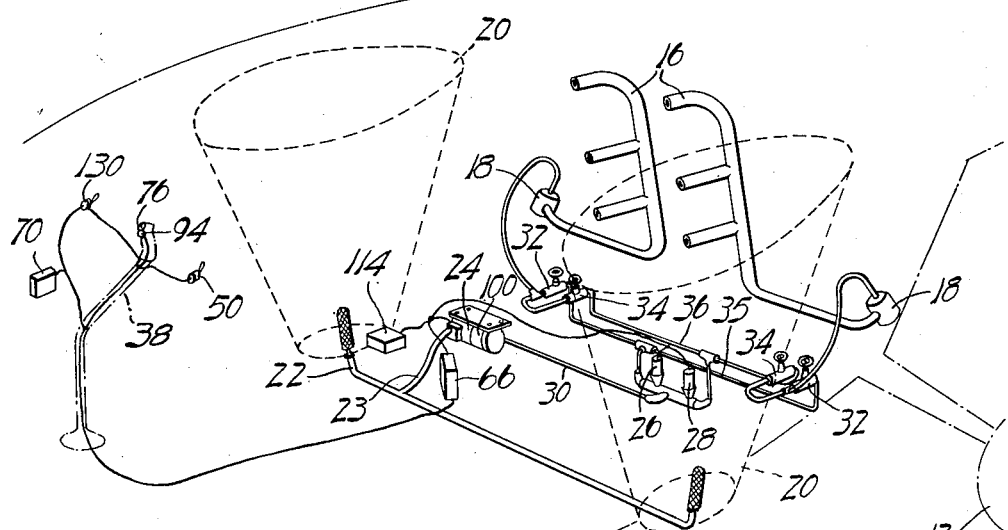

In the drawing, the helicopter is shown as comprising generally a body 10; landing wheels 12; and a lift rotor 14. Although the engine is not shown the exhaust manifolds thereof are indicated at 16—16 and are arranged to supply hot gases to a pair of spray heads 18—18, which may be of any suitable type such as the Todd Shipyards No. 31717 fog generator head that will

2 generate different sized spray droplets according to the rate at which they are supplied with spray material.

The insecticide or other fluid to be sprayed is supplied from a pair of tanks or hoppers 20—20 to the spray heads 18—18 by means of conduits 22—23 and a pump 24, together with a dual control system of the present invention. This novel control system comprises a pair of normally closed solenoid valves 26—28; two pair of needle valves 32—32 and 34—34; and suitable conduits 30 and 35. As is most clearly shown in Fig. 2, the solenoid valves 26—28 are fed in parallel from the pump 24 through the conduit 30. Each solenoid valve 26—28 in turn feeds a separate pair of needle valves 32—32 and 34—34. Thus, the solenoid valve 26 controls the supply to the needle valves 32—32 and the solenoid valve 28 controls the supply to the needle valves 34—34. Finally, corresponding needle valves of each said pair are connected in parallel to feed one spray head 18; the other needle valves of the said pairs being connected in parallel to the other spray head 18.

Any suitable control means may be employed for the operation of the pump 24 and the solenoid valves 26—28 while the aircraft is in flight, such as for example, the electrical circuit shown in Fig. 3. In the illustrated control, one side of a double pole single throw power switch 50 is connected to a direct current power source 52 by means of conductors 54—56 and a circuit breaker 58. One terminal 60 of the other side of the switch 50 is connected to terminal 62 of a triple pole normally open relay 66, by means of a conductor 64. Terminal 60 is also connected to terminal 68 of a normally closed single pole relay 70 by means of conductors 64—71. The coil 72 of the relay 70 is connected between terminal 68 thereof and terminal 74 of a single throw single pole stop switch 76, by means of the conductors 78—80. The other side of the switch 76 is connected to ground.

The other terminal 82 of the relay 70 is connected by means of a conductor 84 to one end of the coil 86 of the relay 66, and the other end of the coil 86 is connected to terminal 88 of the relay 66 and also by means of a conductor 90 to one terminal 92 of a single pole single throw start switch 94. The other terminal of which is connected to ground. A terminal 96 of the relay 66, corresponding to terminal 88 thereof and connectable thereto by contactor 97 thereof, is connected to ground. A jumper 98 connects terminal 62 of the relay 66 to terminal 99 thereof, which in turn is connectable to a pump motor 100 by means of contactor 102 of the relay 66 and connecting conductor 104. The other side of the pump motor 100 is connected to ground. A terminal 106 of the remaining contactor 108 of the relay 66 is connected by means of a conductor 110 to terminal 112 of a single pole double throw relay 114.

The relay 114 is spring biased so that its contactor 116 connects to terminal 118 when the coil 120 thereof is energized, and connects to terminal 122 when the coil 120 is not energized. Terminal 122 is connected to a normally closed solenoid valve 28 by means of a conductor 124, and terminal 118 is connected to a normally closed solenoid valve 26 by means of a conductor 126. The other sides of the solenoid valves 26—28 are connected to ground. A conductor 128, with a single pole single throw selector switch 130 interposed therein connects terminal 132 of the power switch 50 with one end of the coil 120 of the relay 114, the other end of the coil 120 being grounded. The power switch 50 labeled "On-Off," and the selector switch 130 labeled "Fog-Spray" are conveniently on the instrument panel (not shown) of the aircraft, while the stop and start switches 76—94 may be embodied as buttons on the pilot control stick 38 (Fig. 1).

For example, in operation the needle valves 32—32 may be preset to meter fluid flow from the pump 24 to the spray heads 18—18 at such a rate that the spray heads will produce a fine fog when the engine of the aircraft is running; while the other needle valves 34—34 may be preset to meter fluid flow from the pump 24 to the spray heads for the production of a heavier spray. Then, when the aircraft is in flight the pilot may cause the spray heads to emit either fine fog or heavier spray at will, according to which pair of needle valves he selects by energizing the corresponding solenoid valve. Thus, when the pilot wishes to spray an area, he will close the power switch 50 to "on" position, and turn the selector switch 130 to its open or "spray" position. Then he will close the start switch 94 momentarily, thus closing a circuit from the power source 52 through the power switch 50, the conductors 64—71, the relay 70, the conductor 84, the coil 86, and the conductor 90 to ground. This will energize coil 86 and thus the close relay 66.

As soon as the relay 66 closes, contactor 97 thereof will connect the low end of the coil 86 directly to ground, by-passing the start switch 94 which may then be released without causing the relay 66 to reopen. When the relay 66 is closed, contactor 102 thereof will connect the pump motor 100 to the power supply through the conductor 104, jumper 98, conductor 64, and the power switch 50 while contactor 108 will supply power to open the solenoid valve 28 through the conductor 110, contactor 116 of the relay 114, and the conductor 124. Thus, spray material will be pumped from the tanks 20 by the pump 24 operated by the pump motor 100 through the open solenoid valve 28 to the needle valves 34—34, which have been preset for spray operation before the flight. When the pilot desires to stop spraying, he will close the stop switch 76 momentarily, thus energizing the coil 72 of the relay 70. The relay 70 will then open, thereby deenergizing the coil 86 and thus opening the relay 66. The pump motor 100 will thus be stopped, and the solenoid valve 28 will reclose.

It will be understood that once the relay 66 opens, the connection from the coil 86 thereof to ground through contactor 97 will be broken, so that the coil 86 cannot be energized again until a new ground is established through the start switch 94.

To change from spray to "fog" operation, the pilot will simply throw the selector switch 130 to "fog," or closed position. Then coil 120 will be energized and the relay 114 be actuated, thus switching the circuit of the conductor 110 from the conductor 124 to the conductor 126. Then when the start switch 94 is closed, closing the relay 66 as before, power will be supplied to the solenoid valve 26 instead of the solenoid valve 28. Thus, spray material will be pumped through the valve 26 to the needle valves 32—32, which have been preset for "fog" operation. It will be obvious that the change from "spray" to "fog" may be made at will with or without first stopping the motor 100. It will also be obvious that whenever the power switch 50 is opened the motor and all coils in the system will be deenergized and the system will return to its normal inoperative condition regardless of whether it was running or not at the time.

Thus, the invention provides a spray control system with utmost flexibility and efficiency of operation, whereby the peculiar spray requirements of each area of ground may be satisfied in rapid succession as the spraying aircraft traverses varying terrain by the mere flip of a switch. Although only two sets of needle valves are used in the illustrated embodiment of the invention, it will be appreciated that any number of pairs could be used for as many choices of predetermined spray weights. Of course, an additional solenoid valve would be necessary for each additional pair of needle valves along with additional selection circuits.

I claim:

1. In an aerial spray system, a single source of spray fluid material, a single spray generating means of a type that will generate spray of different droplet sizes according to the rate at which spray material is delivered thereto, a system of schematically parallel conduits for delivering said spray material from said source to said spray generating means, preset spray fluid metering means disposed to control flow through each of said conduits, valve means for separate control of said conduits, and pilot-operable control means for selective control of said valve means, whereby spray material may be delivered from said source to said spray generating means at different predetermined rates for generation of spray of the same spray material in different droplet sizes under the selective control of the pilot during flight.

2. In an aerial spray device, a source of spray material, a single spray generating means of a type that will generate sprays of different types according to the rate at which spray material is delivered thereto, means including functionally parallel conduit means for delivering said spray material from said source to said spray generating means, preset spray material metering means disposed and adapted to control flow through each of said conduit means at different rates, valves for separate control of said conduit means, and pilot-operable remote control means for selective control of said valves including interlock means arranged so that only one of said valves is open at a given time, whereby spray material may be delivered from said source to said spray generating means at different predetermined rates for generation of spray of different types.

3. In an aerial spray system, a source of fluid spray material, a single spray generating means of a type that will generate spray of different droplet sizes according to the rate at which spray material is delivered thereto, multiple preset control means for metering fluid flow from said source at different rates to said spray generating means, and pilot-operable control means for selective employment of said preset control means, whereby said spray generating means may be caused to emit spray of different predetermined coarsenesses upon manipulation of said pilot-operable control means.

4. In an aerial spray system, a pump, a single spray generating means of a type that will generate spray of different droplet sizes according to the rate at which fluid is delivered thereto, dual preset control means for metering fluid flow from said pump to said spray generating means at different rates of flow, and pilot-operable control means for selective employment of said preset control means, whereby said spray generating means may be caused to emit relatively coarse spray or relatively fine fog upon adjustment of said pilot-operable control means.

5. In an aerial spray system, a single source of fluid spray material, a single spray generating means of a type that will generate spray of different droplet sizes according to the pressure at which spray material is delivered thereto, multiple preset control means for delivering fluid from said source at different pressures to said spray generating means, and pilot-operable control means including interlock means for selective individual employment of said preset control means one to the exclusion of another, whereby said spray generating means may be caused to emit spray of the same spray material in different predetermined coarsenesses at the will of the pilot upon adjustment of said pilot-operable control means, according to which one of said preset control means is so employed.

References Cited in the file of this patent

UNITED STATES PATENTS

| Number | Name | Date |
|---|---|---|
| 2,266,354 | Christenson | Dec. 16, 1941 |
| 2,335,716 | Weeden | Nov. 30, 1943 |
| 2,380,827 | Downs | July 31, 1945 |
| 2,511,626 | Einbecker | June 13, 1950 |
| 2,513,081 | Clark | June 27, 1950 |
| 2,564,392 | Burrucker | Aug. 14, 1951 |